though and Jan. 26, 1971

3,558,635
PROCESS FOR THE PREPARATION OF
PHOSPHONAMIDES
Henri Marie Normant, Paris, France, assignor to Rhone-
Poulenc S.A., Paris, France, a French body corporate
No Drawing. Filed Nov. 20, 1967, Ser. No. 684,499
Claims priority, application France, Nov. 29, 1966,
85,816; May 11, 1967, 106,120
Int. Cl. C07f 9/44
U.S. Cl. 260—293                                         2 Claims

ABSTRACT OF THE DISCLOSURE

The invention relates to alkali metal diamidophosphites of formula:

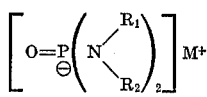

where $R_1$ and $R_2$ are organic radicals and M is an alkali metal, which can be prepared by reacting a halogenophosphonamide with an alkali metal, for example sodium, in a suitable solvent. Examples of suitable diamidophosphites are sodium N,N,N',N'-tetramethyldiamidophosphite, N,N,N',N'-tetraethyldiamidophosphite and dipiperidinophosphite. The invention also relates to a process for converting the diamidophosphites into organic compounds containing the

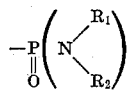

group by reacting them with a reactive ester. The phosphonamide products are useful as pesticides.

---

The present invention relates to the preparation of diamidophosphites of alkali metals, to a process for preparing the diamidophosphites, and to a process for using them in the synthesis of phosphonamides, which are compounds which may be employed in various applications, notably as pesticides.

It has been found that halogenophosphonamides such as, for example chlorophosphonamides of the formula:

react with the alkali metals, for example sodium, to give derivatives, hereinafter called "alkali metal diamidophosphites," which may be represented by the following formula:

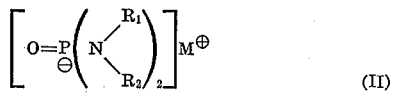

In these formulae $R_1$ and $R_2$ represent identical or different organic radicals and M represents an alkali metal. In particular $R_1$ and $R_2$ can represent lower alkyl radicals; the radical

can also represent a heterocyclic radical, optionally substituted, such as piperidino, pyrrolidino and morpholino.

In practice, for preparing these compounds, a halogenophosphonamide (I), or a solution of this phosphonamide, is gradually added to the appropriate quantity of alkali metal dispersed in an appropriate solvent, for example ether. Various organic solvents, for example benzene, may be employed to dilute the phosphonamide. The reaction is carried out under conditions such that the temperature of the reaction medium remains in the neighbourhood of 20–30° C.

The compounds of Formula II thus prepared can be reacted with all kinds of reactive esters to give phosphonamides according to the reaction scheme:

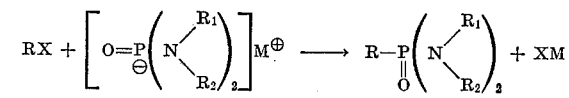

In this diagram, RX represents the reactive ester, X being a halogen atom, more particularly chlorine or bromine, or a radical such as methoxysulphonyloxy, methanesulphonyloxy, benzenesulphonyloxy or toluenesulphonyloxy, and R being an organic radical. R may be an aliphatic or alicyclic hydrocarbon radical, which is either saturated or has one or more double bonds, and which is optionally substituted by various atoms or functional groups which are not capable of interfering with the reaction under consideration. More particularly, the substituent functional group may be an organo-oxy or organothio group, for example, alkoxy, alkenyloxy, aryloxy, alkylthio, alkenylthio or arylthio groups. The symbol R may also represent an aryl radical, more particularly phenyl, having substituents which impart to the atom or group X sufficient mobility to render the reaction possible.

More specifically, RX may represent an alkyl chloride or bromide, having either a short chain or a long chain, an alkenyl halide, a cycloalkyl or cycloalkenyl halide whose rings may be either large (for example rings having 12 carbon atoms), or small, an aralkyl halide, for example benzyl or phenylethyl chloride, an aralkenyl halide or an alkyl chloralkyl ether or thioether.

The corresponding methanesulphonates, benzenesulphonates or toluene-p-sulphonates and compounds such as dialkyl sulphates, for example dimethyl sulphate, diethyl sulphate or dibutyl sulphate, may also be employed.

The compounds (II) may also be reacted with reactive esters having a number of reactive ester functions, more particularly polyhalides such as, for example, dichloro- or dibromo-alkanes or -cycloalkanes. Organic compounds having as many groupings

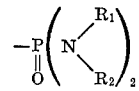

as there are reactive ester functions in the starting ester may thus be obtained.

The preparation of phosphonamides by the process of the present invention is effected by simple addition of the reactive ester to the compound II dispersed in an appropriate organic medium, for example ether.

The reactive ester may be added as such or after dilution in an organic compound which is liquid and inert under the operating conditions. Preferably, the reaction medium is maintained at a fairly low temperature (for example 0–10° C.) throughout the addition of the reactive ester. It may then be moderately heated if this is found necessary in order to complete the reaction. The isolation of the phosphonamides thus obtained may be effected by application of any usual method.

The following examples, which are given without limitation, illustrate the invention and show it can be put into practice:

EXAMPLE 1

Metallic sodium (4.6 g.; 0.2 mol was finely dispersed under boiling toluene, the operation being carried out with a turbine in a three-necked round-bottomed 250-cc. flask provided with a condenser and protected from atmospheric moisture by a calcium chloride trap. The mixture was then cooled, the toluene decanted and the sodium powder placed under anhydrous diethyl ether (about 100 cc.) after two successive washings with anhydrous ether.

The flask was then provided with a simple stirrer and a dropping funnel, the condenser and the moisture trap remaining in position.

While the mixture was being stirred, chlorotetramethylphosphonamide (17.05 g.; 0.1 mol) diluted with its own volume of anhydrous benzene were added gradually over 0.5 hr. by means of the dropping funnel, so as to maintain the temperature of the medium in the neighbourhood of 20 to 25° C.

The stirring was continued for half a day. The sodium diamidophosphite was then employed as such for a subsequent condensation.

EXAMPLE 2

Sodium diamidophosphite, prepared as indicated in Example 1, was treated dropwise over 0.5 hr. with ethyl bromide (10.9 g.; 0.1 mol) diluted in anhydrous ether. The reaction was exothermic and the flask was maintained at 0–5° C. by means of an iced water bath. The temperature of product was then allowed to return to ambient temperature and the product was heated for 4 hrs. under reflux of the ether; the sodium halides were then separated from the ether to give (N,N,N',N'-tetramethyl)ethanephosphonamide, B.P. (0.5 mm. Hg) (yield 61%) 63.5° C.; $n_D^{23}=1.4567$; $D_4^{26}=1.002$:

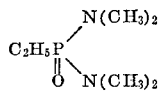

Employing the same procedure a series of phosphonamides of the formula:

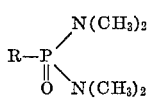

was prepared, each of which is defined in the following table.

| Reactant | R | Yield, percent | B.P., t.° C./mm. Hg | $n_D^t$ | $D_4^t$ |
|---|---|---|---|---|---|
| CH₃Br | CH₃ | 44 | 55/0.4 | 1.4572/21° C. | 1.022/24° C. |
| C₂H₅Br | CH₃CH₂ | 61 | 63.5/0.5 | 1.4567/23° C. | 1.002/26° C. |
| CH₃(CH₂)₂Br | CH₃(CH₂)₂ | 50 | 70/0.4 | 1.4553/22° C. | 0.983/24° C. |
| n-C₄H₉Br | CH₃(CH₂)₃ | 62 | 80/0.4 | 1.4564/22° C. | 0.972/24° C. |
| n-C₇H₁₅Br | CH₃(CH₂)₆ | 64 | 113/0.4 | 1.4601/22° C. | 0.950/25° C. |
| S O₂(OCH₃)(OCH₃) | CH₃ | 30 | 55/0.4 | 1.4550/24.5° C. | |

EXAMPLE 3

Using the procedure of Example 2, but replacing the ethyl bromide with 1,4-dibromobutane (10.8 g.; 0.05 mol), butane-1,4-bis-(N,N,N',N'-tetramethylphosphonamide), which, after recrystallisation from hexane, melted at 111° C., was obtained.

In the same way, 1,3-dibromopropane was converted into propane-1,3-bis(N,N,N',N'-tetramethylphosphonamide).

EXAMPLE 4

Using the procedure of Example 2, but with benzyl chloride instead of ethyl bromide (N,N,N',N'-tetramethyl)phenylmethanephosphonamide, M.P. 81° C., was obtained.

EXAMPLE 5

Using the procedure of Example 2, but with 1-chloro-2,4-dinitrobenzene added in solid form (N,N,N',N'-tetramethyl)-2,4-dinitrobenzenephosphonamide, M.P. 75° C., was obtained.

EXAMPLE 6

Using the procedure of Example 2, but employing a chloromethylether, the corresponding phosphonamides, the characteristics of which are given in the following table, were obtained:

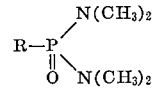

| Chloromethyl ether (or thioether) | R | Yield, percent | B.P., t.°C./mm. Hg | $n_D^t$ (t=° C.) | $D_4^t$ (t=° C.) |
|---|---|---|---|---|---|
| CH₃OCH₂Cl | CH₃OCH₂ | 45 | 77/0.6 | 1.4567/23° | 1.053/25° |
| C₂H₅OCH₂Cl | C₂H₅OCH₂ | 48 | 80–81/0.5–0.6 | 1.4542/23° | 1.022/23° |
| CH₃(CH₂)₂OCH₂Cl | CH₃(CH₂)₂OCH₂ | 35 | 78–82/0.5 | 1.4494/23° | 0.993/25° |
| CH₃(CH₂)₃OCH₂Cl | CH₃(CH₂)₃OCH₂ | 46 | 96–98/0.5 | 1.4533/24.5° | 0.993/27° |
| CH₃(CH₂)₃SCH₂Cl | CH₃(CH₂)₃SCH₂ | 40 | 118–120/0.5–0.6 | 1.4927/22° | 1.050/23° |

EXAMPLE 7

Using the procedure indicated in Example 1, sodium (4.6 g.) in anhydrous ether was treated with chlorotetraethylphosphonamide (22.6 g.; 0.1 mol) in anhydrous cyclohexane (20 cc.) to give sodium diamidophosphite, which can be employed for the preparation of various phosphonamides.

The chlorotetraethylphosphonamide employed as starting material can be obtained by reacting phosphorus oxychloride with anhydrous diethylamine, the operation being carried out in an anhydrous ether medium at low temperature (0–5° C.). After the diethylamine hydrochloride had been filtered off and the ether had been eliminated from the filtrate, chlorotetraethylphosphonamide, B.P. (0.1 mm. Hg) 101–106° C., was obtained.

EXAMPLE 8

Sodium diamidophosphite, prepared as indicated in Example 7, and cooled to 0° C., was slowly treated with ethyl bromide (12 g.; 0.11 mol) in anhydrous ether (25 cc.). The treatment was continued as indicated in Example 2 to give (N,N,N',N'-tetraethyl)ethanephosphonamide, (9.6 g.) B.P. (0.17 mm. Hg) 78–82° C.

EXAMPLE 9

Sodium diamidophosphite, prepared as indicated in Example 7, and cooled to 0° C., was treated with chloromethoxyethane (9.5 g.; 0.1 mol) in anhydrous ether (25 cc.). The treatment was continued as indicated in Example 2 to give a compound (8.5 g.), B.P. (0.17 mm. Hg) 93–96° C., of the formula:

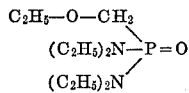

EXAMPLE 10

Sodium diamidophosphite, prepared as indicated in Example 7, and cooled to 0° C., was treated with 1-chloro-3-methyl-but-2-ene (10.5 g.) in anhydrous ether (25 cc.). Treatment as previously indicated, gave a compound (16.3 g.) B.P. (0.12 mm. Hg) 107–115° C., of the formula:

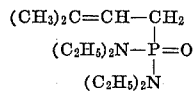

EXAMPLE 11

By the procedure of Example 7, replacing the chlorotetraethylphosphonamide by chlorodipiperidylphosphonamide (25.1 g.) the sodium diamidophosphite of the formula:

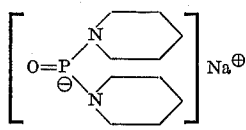

was obtained.

The chlorodipiperidylphosphonamide employed as starting material, having B.P. (0.1 mm. Hg) 145–154° C., was obtained from phosphorus oxychloride and piperidine by the procedure indicated in Example 7.

EXAMPLE 12

Sodium diamidophosphite obtained as indicated in Example 11, and cooled to 0° C., was treated with ethyl bromide (12 g.) in anhydrous ether (25 cc.). After treatment as indicated in the preceding examples, a compound (5.7 g.) B.P. (0.12 mm. Hg) 110–115° C., having the formula:

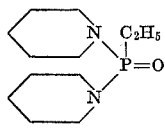

was obtained

EXAMPLE 13

Sodium diamidophosphite obtained as indicated in Example 11 and cooled to 0° C., was treated with chloromethoxyethane (9.5 g.) and, after treatment as indicated in the preceding examples, a compound (7.9 g.) B.P. (0.15 mm Hg) 130–150° C, having the formula

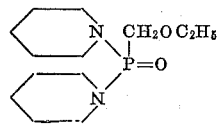

was obtained.

I claim:
1. A process for preparing an organic compound having the following general formula

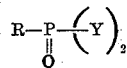

where Y is a member selected from the group consisting of piperidino, pyrrolidino, morpholino and

where $R_1$ and $R_2$ represent lower alkyl radicals and R is a member selected from the group of aliphatic, alicyclic and aromatic hydrocarbon radicals consisting of alkyl, alkenyl, alkoxy, alkyl, alkylthio alkyl, cycloalkyl, cycloalkenyl, aralkyl, aralkenyl and 2,4-dinitrophenyl, said process comprising: reacting an organic compound having the general formula RX with a solution of an alkali metal diamidophosphite wherein R is as defined above, X is a member selected from the group consisting of halogen, methoxysulphonyloxy, methanesulphonyloxy, benzenesulphonyloxy, and toluenesulphonyloxy and said alkali metal diamidophosphite is obtained by reacting a halogenophosphonamide of the general formula

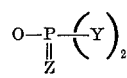

with an alkali metal in an inert organic solvent at a temperature from 20 to 30° C. wherein Z is a halogen atom and Y is as defined above.

2. A process for preparing an organic compound having the following general formula

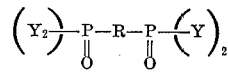

where Y is a member selected from the group consisting of piperidino, pyrrolidino, morpholino and

where $R_1$ and $R_2$ represent lower alkyl radicals and R is a member selected from the group of divalent aliphatic, alicyclic and aromatic hydrocarbon radicals consisting of alkyl, alkenyl, alkoxy alkyl, alkylthio, alkyl, cycloalkyl, cycloalkenyl, aralkyl, aralkenyl and 2,4-dinitrophenyl said process comprising: reacting an organic compound having the general formula $RX_2$ with a solution of an alkali metal diamidophosphite wherein R is as defined above, X is a halogen and said alkali metal diamidophosphite is obtained by reacting a halogenophosphonamide of the general formula

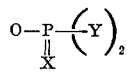

with an alkali metal in an organic solvent at a temperature from 20 to 30° C. wherein X and Y are as defined above.

References Cited

UNITED STATES PATENTS 2,613,224   10/1952   Paulshock            60—545

OTHER REFERENCES

Kosolapoff et al., J. Org. Chem. 21, 413–4 (1956).

HENRY R. JILES, Primary Examiner

C. T. TODD, Assistant Examiner

U.S. Cl. X.R.

260—246, 326.61, 551; 424—320

UNITED STATES PATENT OFFICE
CERTIFICATE OF CORRECTION

Patent No. 3,558,635                    Dated January 26, 1971

Inventor(s) Henri Marie Normant

It is certified that error appears in the above-identified patent and that said Letters Patent are hereby corrected as shown below:

> French priority application number is reflected as being 85,816. This should read 85,416.

Signed and sealed this 11th day of May 1971.

(SEAL)
Attest:

EDWARD M. FLETCHER, JR.
Attesting Officer

WILLIAM E. SCHUYLER,
Commissioner of Paten